US009683493B2

(12) United States Patent
Quix et al.

(10) Patent No.: US 9,683,493 B2
(45) Date of Patent: Jun. 20, 2017

(54) METHOD AND SYSTEM FOR ADJUSTING A COMPRESSION RATIO

(71) Applicant: Ford Global Technologies, LLC, Dearborn, MI (US)

(72) Inventors: Hans Guenter Quix, Herzogenrath (DE); David van Bebber, Aachen (DE); Florian Huth, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 14/734,540

(22) Filed: Jun. 9, 2015

(65) Prior Publication Data

US 2015/0369139 A1     Dec. 24, 2015

(30) Foreign Application Priority Data

Jun. 18, 2014    (DE) .................. 10 2014 211 717

(51) Int. Cl.
| F02B 75/26 | (2006.01) |
| F02D 15/04 | (2006.01) |
| F02B 23/10 | (2006.01) |
| F02M 57/06 | (2006.01) |
| F02B 75/04 | (2006.01) |
| F02M 61/14 | (2006.01) |

(52) U.S. Cl.
CPC ............ *F02D 15/04* (2013.01); *F02B 23/101* (2013.01); *F02B 75/042* (2013.01); *F02M 57/06* (2013.01); *F02M 61/14* (2013.01); *F02M 2200/851* (2013.01); *Y02T 10/125* (2013.01)

(58) Field of Classification Search
CPC ........ F02D 15/04; F02M 61/14; F02M 57/06; F02M 2200/851; F02B 75/042; F02B 23/101; Y02T 10/125
See application file for complete search history.

(56) References Cited

U.S. PATENT DOCUMENTS

| 2,534,860 | A | * | 12/1950 | Fisher | .................. F02M 69/00 123/169 R |
| 4,144,851 | A | * | 3/1979 | Prosen | ................... F02D 15/04 123/48 C |
| 4,148,284 | A | * | 4/1979 | Prosen | ................. F02B 75/041 123/48 C |
| 4,449,489 | A | * | 5/1984 | Williams | .............. F02B 75/042 123/169 PA |
| 4,539,946 | A | * | 9/1985 | Hedelin | ............. F02D 13/0215 123/202 |

(Continued)

FOREIGN PATENT DOCUMENTS

| DE | 19858245 A1 | 6/2000 |
| DE | 19954438 A1 | 5/2001 |

(Continued)

*Primary Examiner* — Hung Q Nguyen
(74) *Attorney, Agent, or Firm* — Julia Voutyras; McCoy Russell LLP

(57) ABSTRACT

Methods and systems are provided for adjusting a compression ratio of a combustion chamber. In one example, a method may include altering an axial position and rotational orientation of a control element comprising a spark plug and a fuel injector in response to an engine operation. The method further includes changing a distance between intake and exhaust valves of a cylinder to the control element, the spark plug, and the fuel injector.

20 Claims, 6 Drawing Sheets

(56) References Cited

U.S. PATENT DOCUMENTS

| | | | |
|---|---|---|---|
| 4,770,136 A * | 9/1988 | Newman | F02N 19/04 |
| | | | 123/179.1 |
| 5,092,287 A | 3/1992 | Motoyama et al. | |
| 5,427,063 A * | 6/1995 | Anderson | F02B 75/042 |
| | | | 123/48 A |
| 5,878,701 A * | 3/1999 | Kahlhamer | F02B 75/042 |
| | | | 123/48 A |
| 5,934,228 A * | 8/1999 | Wheat | F02B 75/041 |
| | | | 123/48 C |
| 6,009,849 A | 1/2000 | Yamamoto et al. | |
| 7,387,103 B2 | 6/2008 | Merritt | |
| 2003/0097998 A1 | 5/2003 | Gray, Jr. | |
| 2007/0256658 A1 | 11/2007 | Andersson et al. | |
| 2010/0242900 A1 | 9/2010 | Hitomi et al. | |
| 2010/0242919 A1 * | 9/2010 | Oprea | F01L 1/181 |
| | | | 123/48 D |
| 2013/0008408 A1 | 1/2013 | Furr | |

FOREIGN PATENT DOCUMENTS

| | | | |
|---|---|---|---|
| EP | 1143586 A1 * | 10/2001 | H01T 13/08 |
| EP | 1309764 A1 | 5/2003 | |
| WO | 03089785 A2 | 10/2003 | |

\* cited by examiner

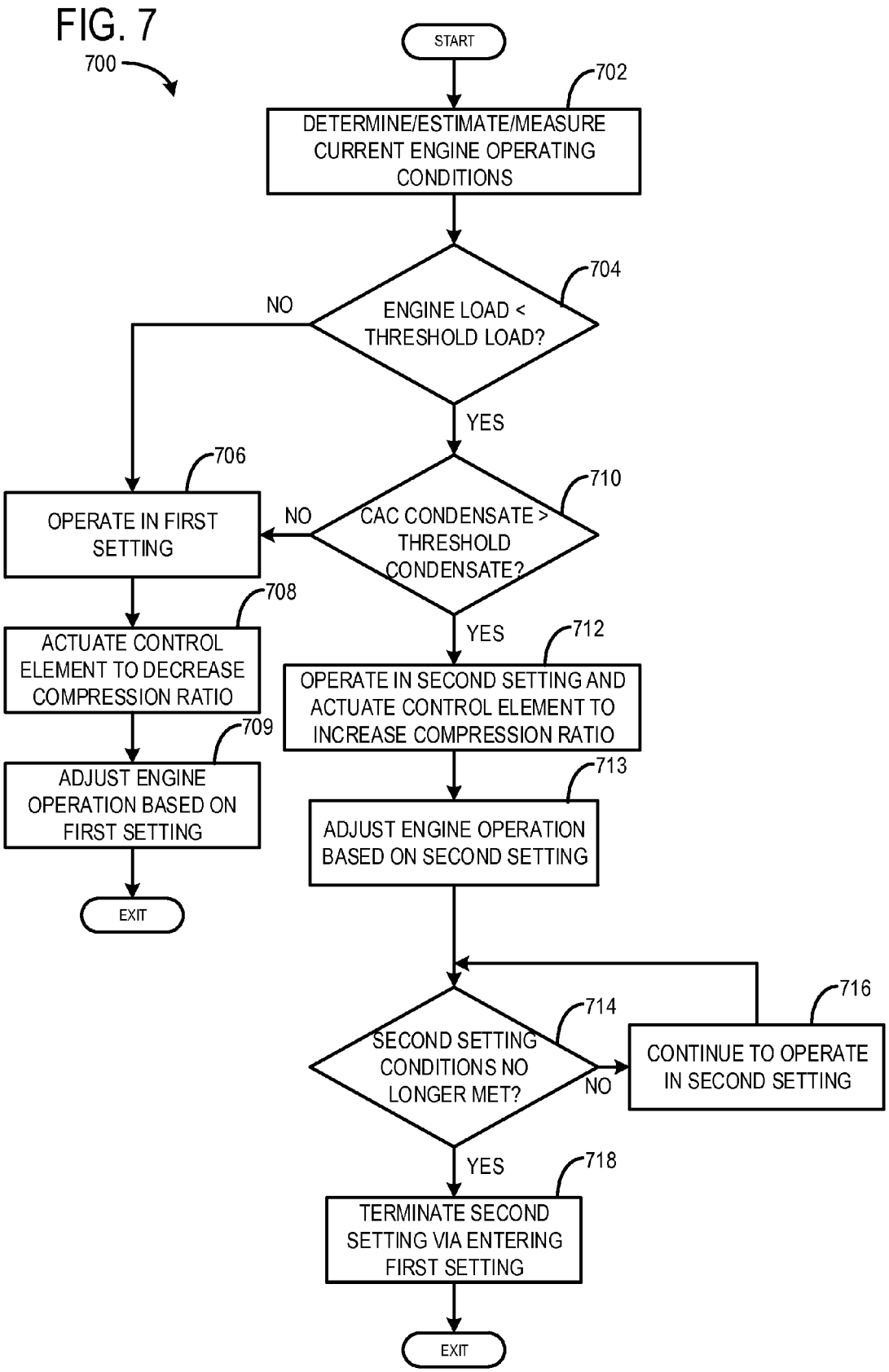

METHOD AND SYSTEM FOR ADJUSTING A COMPRESSION RATIO

CROSS REFERENCE TO RELATED APPLICATIONS

The present application claims priority to German Patent Application No. 102014211717.8, filed Jun. 18, 2014, the entire contents of which are hereby incorporated by reference for all purposes.

FIELD

The present invention relates to an adjustable control system for altering a compression ratio of a combustion chamber.

BACKGROUND\SUMMARY

Altering a compression ratio of a combustion chamber of an engine can improve fuel efficiency of an engine. By increasing a volume of the combustion chamber, the compression ratio is increased, allowing a greater pressure increase in the combustion chamber. In this way, a combustion temperature of the combustion chamber is also increased.

A problem with altering a compression ratio may be increased emissions at higher loads (e.g., mid load). By increasing the compression ratio, and thereby the combustion temperature, $NO_x$ emissions may increase. Furthermore, due to an increase the combustion chamber volume, an amount of intake air delivered to the combustion chamber increases. In order to prevent knock, an injection volume may also be increased. As a result of increasing the injection volume, hydrocarbon (HC) emissions may also increase.

Attempts to address the above described issues with regards to altering a compression ratio include an inner piston and an outer piston bounding as shown by Fischer et al. in D.E. 19858245. Therein, the outer piston bounding comprises an adjustable outer piston bounding compression magnitude. The outer piston bounding compression magnitude is adjusted based on the inner piston and a controlled fluid amount between the inner piston and the outer piston bounding.

However, the inventors have found problems with the art described above. In one example, the art can be expensive to construct and implement. As a second example, the art described above does not adequately decrease emissions during increased compression ratio use to mid-load.

In one example, the issues described above may be addressed by a method for adjusting a compression ratio of a combustion chamber via adjusting a volume of the combustion chamber by actuating a control element along a control element axis. A spark plug and/or a fuel injector are arranged on the control element.

As one example, the control axis runs along an axial axis of the combustion chamber with which a piston of the combustion chamber is movable. Therefore, the control element may be actuated closer to or farther from the combustion chamber. Furthermore, the control element may be rotated such that a rotational orientation of the control element, the spark plug, and the fuel injector is changed about the control axis.

In this way, the control element, the spark plug, and the fuel injector may be at a first axial position and a first rotational orientation at a first location while having a second axial position and second rotational orientation at a second location. The first location may be a location of the control element farthest from the combustion chamber, thereby minimizing a compression ratio of the combustion chamber. The second location may be a location of the control element nearest to the combustion chamber, thereby maximizing the compression ratio of the combustion chamber.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows a method for adjusting the reciprocating piston engine from the first setting to the second setting.

DETAILED DESCRIPTION

Figure 1:
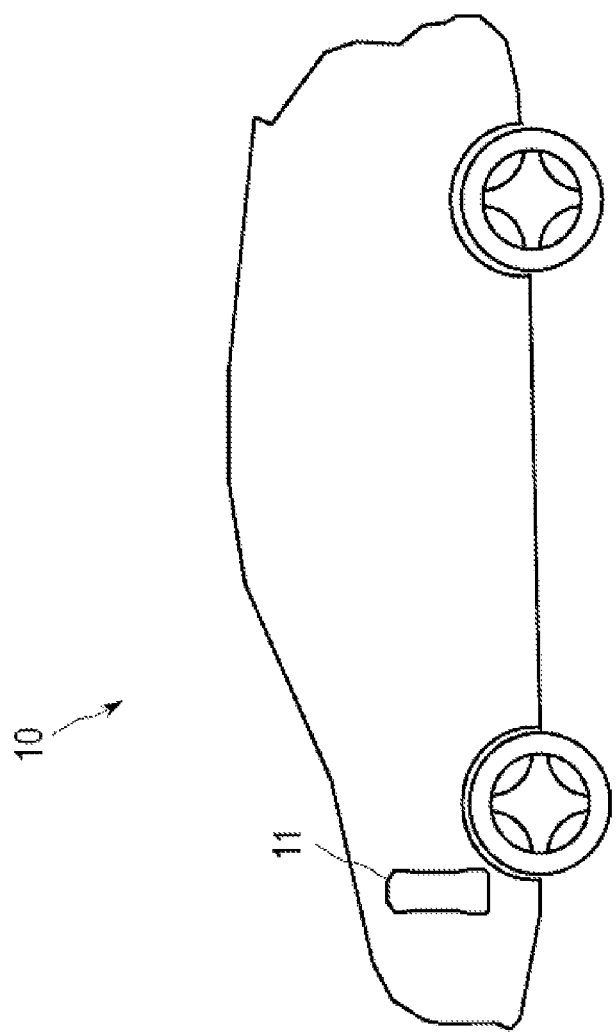
FIG. 1 shows an exemplary embodiment of a motor vehicle comprising a reciprocating piston engine.
Figure 2:
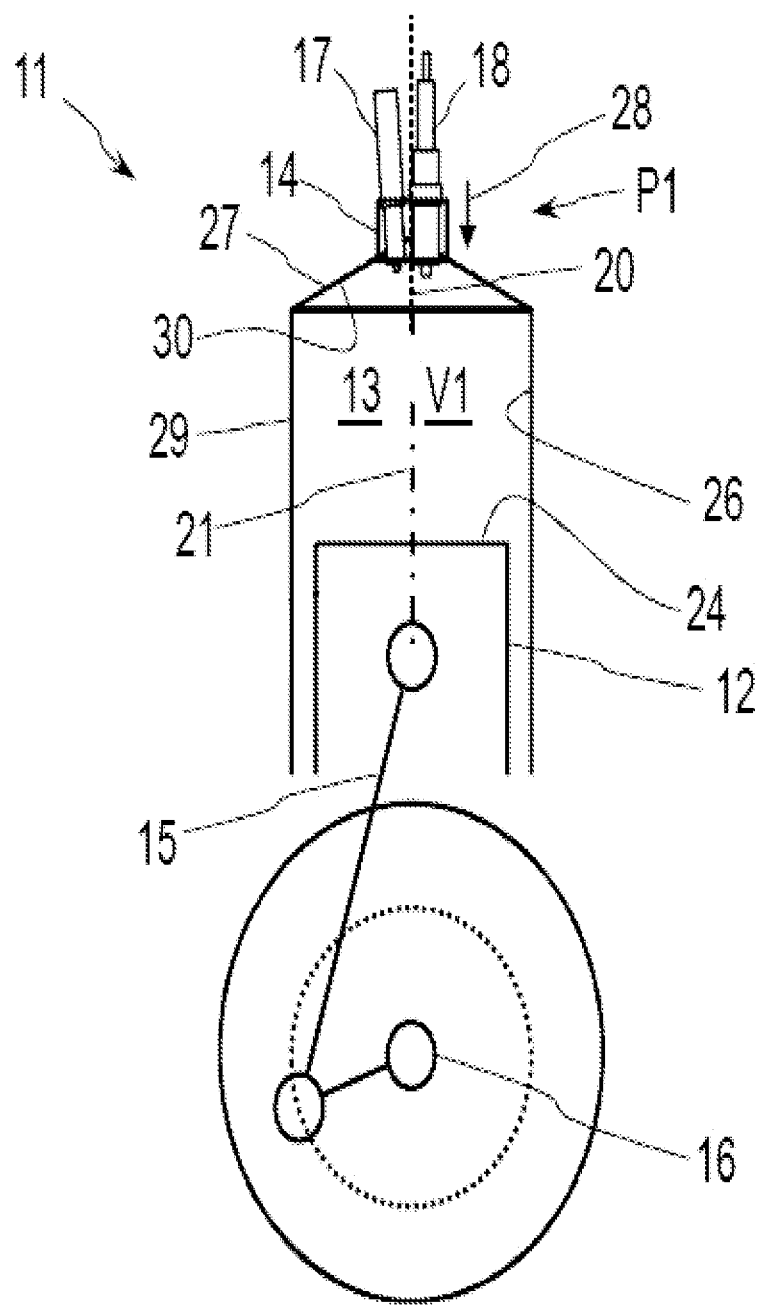
FIG. 2 shows a reciprocating piston engine in a first setting.
Figure 3:
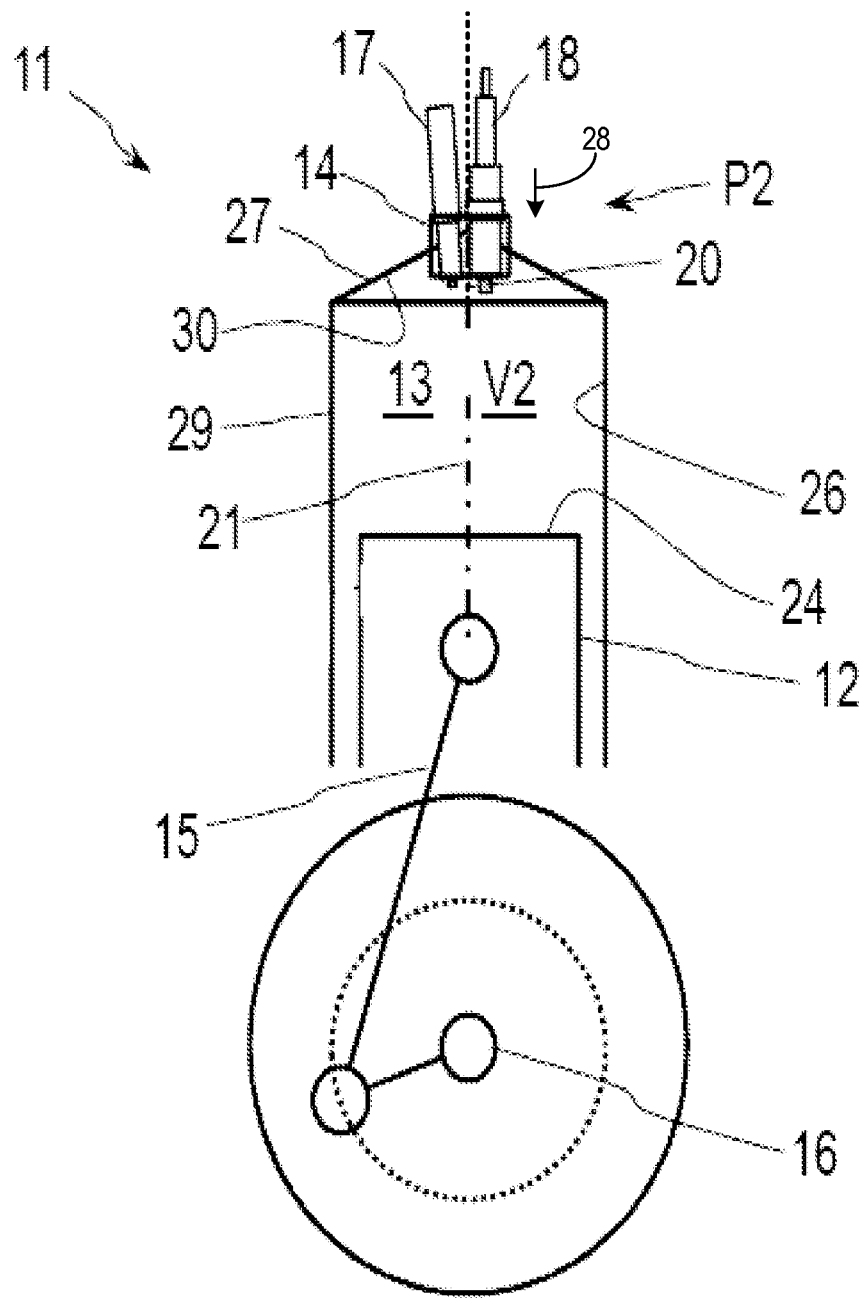
FIG. 3 shows the reciprocating piston engine in a second setting.
Figure 4:
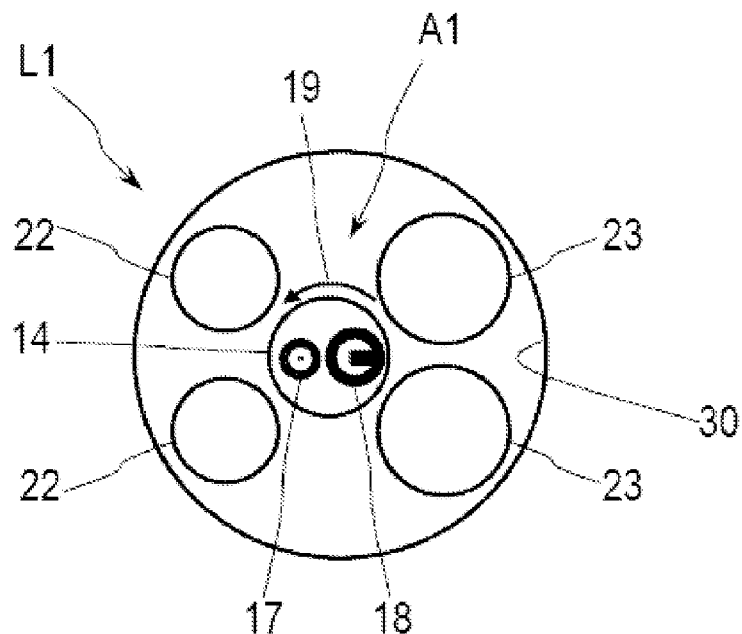
FIG. 4 shows the reciprocating piston engine in a third setting.
Figure 5:
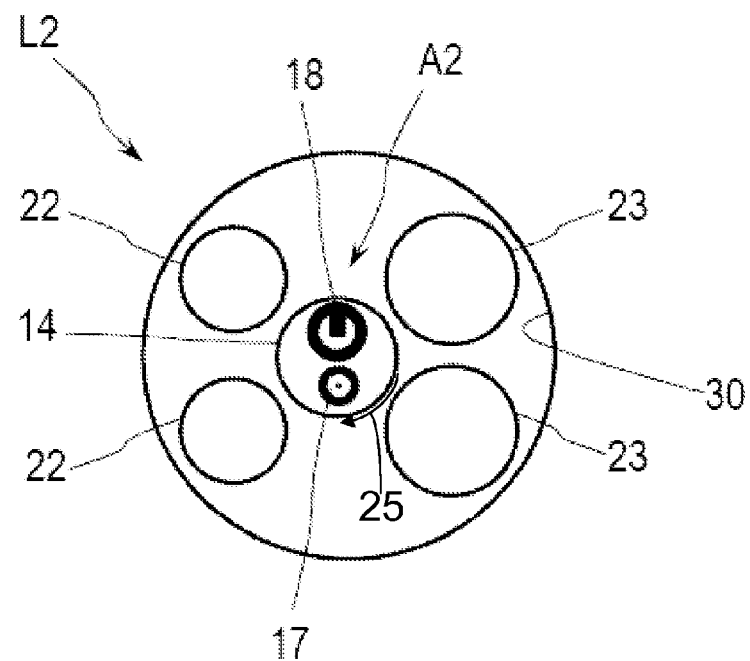
FIG. 5 shows the reciprocating piston engine in a fourth setting.
Figure 6:
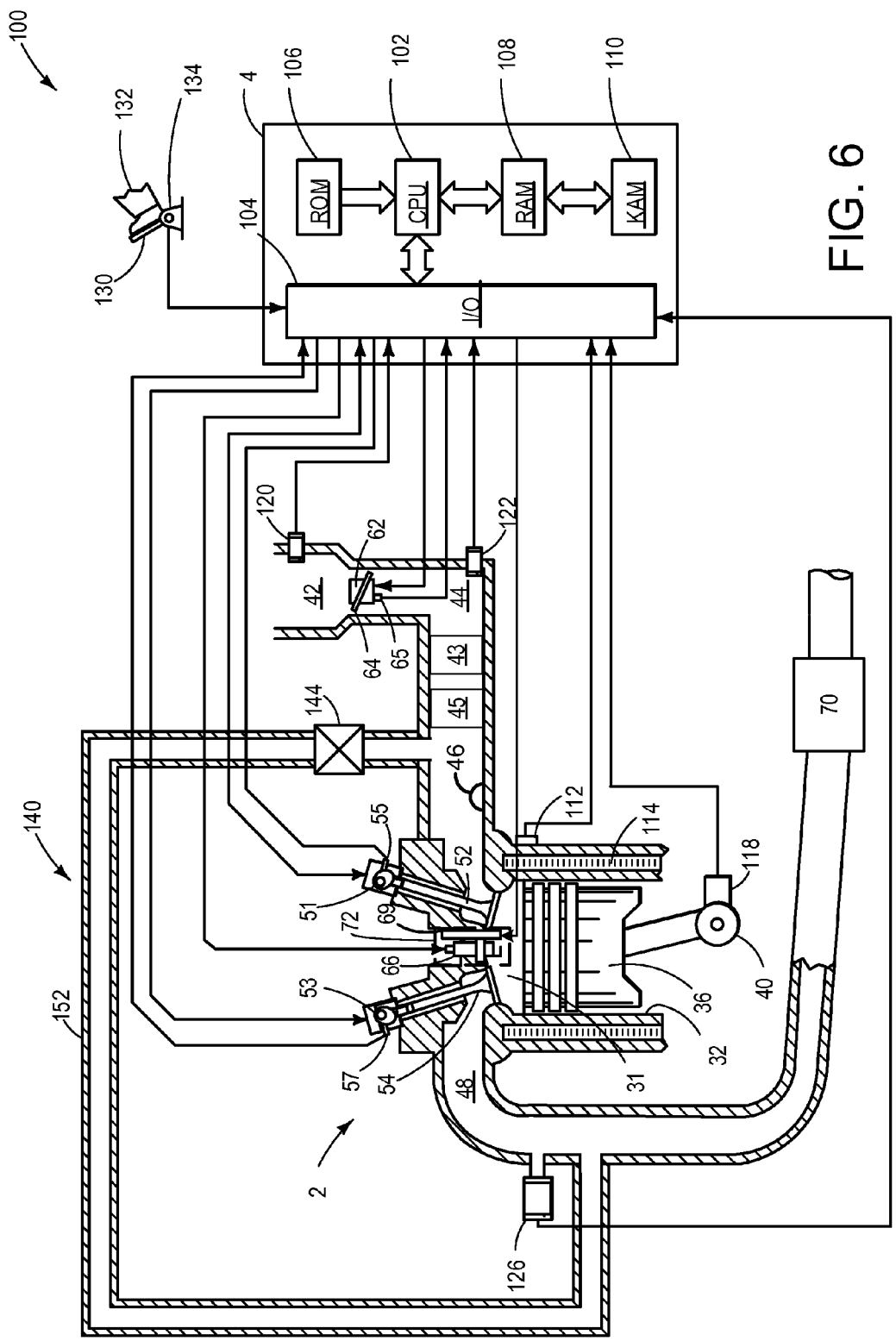
FIG. 6 shows an engine depicted with a single cylinder.

The present description relates to methods and systems for operating a reciprocating piston engine. A vehicle with the reciprocating piston engine is shown in FIG. 1. The reciprocating piston engine comprises an adjustable control element. The control element is physically coupled to a spark plug and fuel injector. The control element may be actuated along a control axis and/or rotated along about the control axis during first and second settings, as shown in FIGS. 2 and 3. A relationship between the control element and various components of the engine is shown in FIGS. 4 and 5. A detailed depiction of the reciprocating piston engine is shown in FIG. 6. A method for adjusting the control element from a first setting to a second setting and vice-versa is shown in FIG. 7.

Turning now to FIG. 1, a vehicle 10 comprises a reciprocating piston engine 11 for propelling the motor vehicle 10.

Turning now to FIG. 2, the reciprocating piston engine 11 of FIG. 1 is shown in greater detail. The engine 11 comprises at least one cylinder 29, which is covered by a cylinder head 27. A piston 12 is arranged in the cylinder 29. The piston 12 is connected to a crankshaft 16 by a connecting rod 15. Translational energy (e.g., kinetic energy) may be transferred from the piston 12 to the crankshaft 16 by the connecting rod 15 in the form of rotational energy. In this way, the piston 12 is displaceable along a stroke axis 21, shown by a single dot dashed line, in order propel a vehicle (e.g., vehicle 10) via combustion.

A combustion chamber 13 is formed in the cylinder 29. The combustion chamber 13 is defined by a combustion chamber wall 26, a piston crown 24 of the piston 12, and by a cylinder head inside wall 30. The combustion chamber wall 26, the piston crown 24, and the cylinder head inside wall 30 thereby form at least a portion of the boundaries of the combustion chamber 13.

The reciprocating piston engine 11 is a spark-ignition engine and is provided with a spark plug 18 projecting into the combustion chamber 13. The reciprocating piston engine 11 is furthermore in particular an engine which is designed for direct fuel injection. For this purpose the reciprocating piston engine 11 comprises an injector 17 projecting into the combustion chamber 13. The spark plug 18 and the injector 17 are arranged in the cylinder head 27. In one embodiment, the spark plug 18 may be omitted such that the engine 11 is a spark-less engine (e.g., a diesel engine).

The reciprocating piston engine 11 comprises a control element 14 where one or more of the spark plug 18 and the injector 17 are mounted. The control element 14 adjoins the combustion chamber 13 and thereby forms a remaining portion of the boundaries of the combustion chamber 13. The control element 14 is adjustable in one or more of its rotational orientation and its axial position relative to the combustion chamber 13.

For example, the control element 14 is adjustable in relation to a control axis 20 (e.g., an axial axis), in such a way that the control element 14 is displaceable parallel to the control axis 20 or rotatable about the control axis 20. In other words, the control element 14 may move up or down along the control axis 20 parallel to the movement of the piston 12 along the stroke axis 21. Therefore, the control axis 20 may be identical to the stroke axis 21. Arrow 28 depicts a direction of axial movement for the control element 14 when it is in a first position P1.

The first position P1 is a position of the control element farthest away from the combustion chamber 13, thereby maximizing a volume of the combustion chamber 13. A compression ratio is dependent upon the volume of the combustion chamber 13. For example, as the volume of the combustion chamber increases, the compression ratio decreases. Therefore, the first position P1 represents a minimum compression ratio of the combustion chamber 13. The minimum compression ratio may be used during engine loads greater than a threshold load (e.g., during high load) to increase fuel economy and prevent knock.

If the control element 14 is displaced along the control axis 20, a compression ratio of the combustion chamber 13 is altered. If the control element 14 is rotated about the control axis 20, then rotational orientation of the spark plug 18 and the fuel injector 17 is similarly rotated. In this way, a height of the control element 14 may be adjusted such that a distance between the control element 14 and the piston 12 is decreased. The position of the control element 14 is thereby defined by the arrangement of the control element 14 at a specific point on the control axis 20, and the orientation of the control element is defined by an arrangement of the control element 14 at a specific angle of rotation about the control axis 20.

The control element 14 is in particular arranged in the cylinder head 27. Here at least the injector 17 and/or the spark plug 18 are immovably connected to the control element 14. That is to say, the injector 17 and/or the spark plug 18 do not vary their location relative to the control element 14 when the control element 14 is adjusted. At least the injector 17 and/or the spark plug 18 are rotationally and/or translationally fixed to the control element. The injector 17 and/or the spark plug 18 can therefore be adjusted by the control element 14. In some embodiments, additionally or alternatively, the spark plug 18 and fuel injector 17 may be adjusted such that their rotational orientations are altered while the rotational orientation of the control element 14 is kept constant (e.g., unchanged).

FIG. 2 represents the reciprocating piston engine 11 with the control element 14 in the first position P1. In the first position P1 the combustion chamber 13 has a first volume V1. The first volume V1 represents a maximum volume of the combustion chamber. If the control element 14 is displaced from the first position P1 along the control axis 20 in a direction toward the combustion chamber shown by arrow 28, then the control element 14 reaches a second position P2, as shown in FIG. 3.

FIG. 3 represents the reciprocating piston engine 11 with the control element 14 in the second position P2. Elements previously depicted in FIG. 2 are similarly numbered in FIG. 3 for reasons of brevity. In the second position P2 the control element 14 is nearest to the combustion chamber 13. Therefore, when the control element 14 is located at the first position P1, the combustion chamber 13 has a first volume V1, as shown in FIG. 2, and when the control element 14 is located at the second position P2, the combustion chamber 13 has a second volume V2. As depicted, the second volume V2 is less than the first volume V1 of FIG. 2. The second volume V2 is smaller than the first volume V1, for the same position of the piston 12. V2 represents a minimum volume of the combustion chamber 13. Therefore, when the control element 14 is in the second position P2, the combustion chamber 13 has a maximum compression ratio. The reciprocating piston engine 11 therefore has a second, larger compression ratio when the control element 14 is located at the second position P2. A combustion chamber charge to be compressed by the piston 12 has less available space than with the first volume.

If the control element 14 is displaced from the second position P2 along the control axis 20 in the opposite direction to the arrow 28 (e.g., away from the combustion chamber 13), the control element 14 reaches the first position P1.

A displacement of the control element 14 in the direction of the arrow 28 (e.g., toward the combustion chamber 13) leads to a reduction of the combustion chamber 13 volume and thereby to an increase in the compression ratio. A displacement of the control element 14 in the opposite direction to the direction of the arrow 28 (e.g., away from the combustion chamber 13) leads to an increase of the combustion chamber 13 volume and thereby to a reduction in the compression ratio. In particular, the compression ratio may be increased in response to an engine load being less than a threshold load.

FIG. 4 represents the reciprocating piston engine 11 with the control element 14 in a first orientation A1. In the first orientation A1 the components (e.g., a fuel injector 17 and a spark plug 18) arranged in the control element 14 have a first location L1. The first location L1 is substantially equal to the first position P1. Therefore, the control element 14, the fuel injector 17, and the spark plug 18 are in a position farthest from a combustion chamber (e.g., combustion chamber 13) in order to minimize a compression ratio. As depicted, when in the first location L1 and therefore first orientation A1, the fuel injector 17 is proximal to inlet valves 22 and the spark plug 18 is proximal to exhaust valves 23. In one embodiment, additionally or alternatively, the control element 14 may be in the first location L1 while being in the second position P2 of FIG. 3.

If the control element 14 is rotated from the first orientation A1 about an axial axis (e.g., control axis 20 of FIG. 2) in a direction of rotation 19 (e.g., counterclockwise), the control element 14 reaches a second orientation A2, as shown in FIG. 5. In one embodiment, the control element 14 may only rotate about the axial axis simultaneously to displacing in a direction toward a combustion chamber along the axial axis. In another embodiment, additionally or alternatively, the control element 14 may rotate about the axial axis independent of the control element 14 being displaced along the axial axis.

FIG. 5 represents the reciprocating piston engine 11 with the control element 14 in the second orientation A2. In the second orientation A2 the components arranged in the control element 14 have a second location L2. The second location L2 may be substantially similar to the second position P2 of FIG. 3. In this way, when the control element 14 is in the second location L2, a volume of a combustion chamber is decreased to a minimum value. In one embodiment, additionally or alternatively, the control element 14 may be in the second location L2 while being in the first position P1 of FIG. 2.

If the control element 14 is rotated from the second orientation A2 about the control axis 20 in an opposite direction (e.g., clockwise) to the direction of rotation 19 of FIG. 4, then the control element 14 reaches the first orientation A1 again. In other words, if the control element is rotated in a direction of rotation 25 (e.g., clockwise).

A rotation of the control element 14 about the control axis 20 leads to a change in the location of the components arranged in the control element 14. In the examples represented in FIGS. 4 and 5, the spark plug 18 and the injector 17 in the first location L1 and the second location L2 have different distances and orientations relative to the inlet valves 22 and exhaust valves 23. By means of the control element 14, rotatable about the control axis 20, the injector 17 can be shifted from a transverse orientation into a longitudinal orientation and vice-versa.

FIGS. 4 and 5 depict the control element 14 which may be simultaneously or separately adjustable in its position and in its location. FIG. 6 depicts an engine with a single cylinder and various other components.

Continuing to FIG. 6, a schematic diagram showing one cylinder of a multi-cylinder engine 2 in an engine system 100, which may be included in a propulsion system of an automobile, is shown. The engine 2 may be controlled at least partially by a control system including a controller 4 and by input from a vehicle operator 132 via an input device 130. In this example, the input device 130 includes an accelerator pedal and a pedal position sensor 134 for generating a proportional pedal position signal. A combustion chamber 31 of the engine 2 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 2. The engine 2 may be substantially equal to the reciprocating piston engine 11 and used in the embodiment of FIG. 1.

The combustion chamber 31 may receive intake air from an intake manifold 44 via an intake passage 42 and may exhaust combustion gases via an exhaust passage 48. The intake manifold 44 and the exhaust passage 48 can selectively communicate with the combustion chamber 31 via respective intake valve 52 and exhaust valve 54. In some examples, the combustion chamber 31 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 4 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 31 may alternatively include an intake valve controlled via electric valve actuation and an exhaust valve controlled via cam actuation including CPS and/or VCT systems.

Upstream of the combustion chamber 31 in the intake manifold 44 exists a compressor 43 and a charge air cooler (CAC) 45. The compressor 43 may be used to compress intake air such that it enters the combustion chamber 31 with a greater pressure than it would without being compressed. The compressor 43 may be coupled to a turbine (not shown), which may be used to at least partially drive the compressor 43.

The CAC 45 may be used to cool the compressed air downstream of the compressor 43 in order to decrease a combustion temperature. The CAC 45 may comprise a series of conduits fluidly coupled to either ram air or liquid coolant. During this cooling process, water from the compressed air may condense onto surfaces of the CAC 45. If the condensate in the CAC 45 exceeds a condensate threshold, then boost may be decrease or terminated. The condensate threshold may be based on an amount of condensate where carrying all the condensate to the combustion chamber 31 could decrease a combustion stability.

A fuel injector 69 is shown coupled directly to combustion chamber 31 for injecting fuel directly therein in proportion to the pulse width of a signal received from the controller 4. Specifically, the fuel injector 69 is arranged within a control element 72, shown by a dashed box. In this manner, the fuel injector 69 provides what is known as direct injection of fuel into the combustion chamber 31. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 31 may alternatively or additionally include a fuel injector arranged in the intake manifold 44 in a configuration that provides what is known as port injection of fuel into the intake port upstream of the combustion chamber 31.

Spark is provided to combustion chamber 31 via spark plug 66. The spark plug 66 is also arranged on the control element 72. The ignition system may further comprise an ignition coil (not shown) for increasing voltage supplied to spark plug 66. In other examples, such as a diesel, spark plug 66 may be omitted.

The control element 72 may be substantially equal to control element 14 of FIGS. 2-5. Therefore, the control element 72 may move in an axial direction to and away from the combustion chamber 31. The control element 72 may also rotate about an axial axis with which the control element is movable. In this way, an axial position and a rotational orientation of the control element 72 may be modified. Furthermore, the spark plug 66 and fuel injector 69 may be actuated in a similar manner to the control element 72 when the control element 72 is actuated.

A charge motion control valve (CMCV) 46 is located upstream of the intake valve 52 in a bottom portion of the intake manifold 44. CMCV 46 may be used to obstruct at least a portion of the intake manifold 44. In this way, intake air flowing though the intake manifold 44 and contacting the CMCV 46 may develop a spin or rotation as it flows into the combustion chamber 31. The CMCV 46 may obstruct a varying amount of the intake manifold 44 based on various engine operations. CMCV 46 is shown in a fully inflated position. Alternately, CMCV may lie flush against the bottom of the intake manifold 44 such that no obstruction of the intake manifold 44 occurs. Thus, the intake air may not develop a spin or rotation.

In one embodiment, the control element 72 and the spark plug 66 and fuel injector 69 mounted on the control element 72 may be adjusted such that their rotation and/or axial displacement are adjusted in response to a position of the CMCV 46. In another embodiment, additionally or alternatively, a position of the CMCV 46 may be adjusted in response to an adjustment and/or position of the control element 72, the spark plug 66, and the fuel injector 69. In this way, a combustion mixing (e.g., a homogeneity of a combustion mixture) may be increased.

As an example, the CMCV 46 may be fully activated when the control element 72 is in a position nearest the combustion chamber 31 (e.g., the second position P2 of FIG. 3). As another example, the CMCV 46 may be decreased or terminated (e.g., flush against the bottom portion of intake manifold 44) when the control element 72 is in a position farthest from the combustion chamber 31 (e.g., the first position P1 of FIG. 2).

The intake passage 42 may include a throttle 62 having a throttle plate 64. In this particular example, the position of throttle plate 64 may be varied by the controller 4 via a signal provided to an electric motor or actuator included with the throttle 62, a configuration that is commonly referred to as electronic throttle control (ETC). In this manner, the throttle 62 may be operated to vary the intake air provided to the combustion chamber 31 among other engine cylinders. The position of the throttle plate 64 may be provided to the controller 4 by a throttle position signal. The intake passage 42 may include a mass air flow sensor 120 and a manifold air pressure sensor 122 for sensing an amount of air entering engine 2.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 4 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 2, the emission control device 70 may be periodically reset by operating at least one cylinder of the engine within a particular air-fuel ratio.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 4 via an EGR valve 144. Under some conditions, the EGR system 140 may be used to regulate the temperature of the air-fuel mixture within the combustion chamber, thus providing a method of controlling the timing of ignition during some combustion modes.

The controller 4 is shown in FIG. 2 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 4 may receive various signals from sensors coupled to the engine 2, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 4 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

As described above, FIG. 6 shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 4 to be carried out by the controller in combination with the engine hardware, as illustrated in FIG. 6.

Turning now to FIG. 7, a method 700 for adjusting a position of a control element (e.g., control element 14 of FIGS. 2-5 and/or control element 72 of FIG. 6) from a first position to a second position or vice-versa is illustrated. Instructions for carrying out method 700 may be executed by a controller (e.g., controller 4) based on instructions stored on a memory of the controller and in conjunction with signals received from sensors of the engine system, such as the sensors described above with reference to FIG. 6. The controller may employ engine actuators of the engine system to adjust engine operation, according to the methods described below.

The method 700 begins at 702, which includes determining, estimating, and/or measuring current engine operating conditions. The current engine operating conditions may include one or more of an engine speed, engine load, manifold vacuum, CAC condensate level, ambient air humidity, and an air/fuel ratio.

At 704, the method 700 includes determining if the engine load is less than a threshold load. The threshold load may be based on a high load. If the engine load is greater than the threshold load, then the method 700 proceeds to 706 to operate in the first setting, which includes decreasing a compression ratio of a combustion chamber in response to the engine load being a high load.

At 708, the method 700 includes actuating the control element to a first, upper position, away from the combustion chamber, in order to increase a combustion chamber volume and decrease the compression ratio of the combustion chamber. By decreasing the compression ratio at high loads, a likelihood of knock is decreased and fuel economy is increased. The method 700 continues to operate in the first setting until a second setting condition(s) is met. For example, the first setting may be terminated in response to the engine load being less than the threshold load.

As described above, during the first setting, the control element is in a first position, away from the combustion chamber. While actuating the control element to the first position from the second position, the control element moves up, away from the combustion chamber while simultaneously rotating in a clockwise direction (e.g., the control element is in the first position P1 of FIG. 2 and first orientation A1 of FIG. 4). By rotating clockwise, the fuel injector is proximal to one or more inlet valves while the spark plug is proximal to one or more exhaust valves. Additionally or alternatively, the control element may move up, away from the combustion chamber without rotating in the clockwise direction. In this way, a rotational orientation of the control element is maintained while an axial position is altered (e.g., the control element is in the first position and a second orientation A2 of FIG. 5).

In one embodiment, additionally or alternatively, adjusting the rotation and position of the control element which the spark plug and/or injector are mounted is in response to a position of a CMCV. In a second embodiment, additionally or alternatively, a position of the CMCV is adjusted in response to a position of the control element.

At 709, the method 700 includes adjusting the engine operation based on the first setting (e.g., decreased compression ratio). The adjustments may include one or more of increasing a primary injection pressure, increasing boost, and retarding spark in order to increase a combustion mixture pressure. These adjustments may assist in increasing a combustion pressure despite the decrease in the compression ratio.

Returning to 704, if the engine load is less than the threshold load then the method 700 proceeds to 710 to determine if a condensate level in a charge air cooler (CAC) is less than a threshold condensate level. The threshold condensate level may be based on an amount of condensate in the CAC where if all the condensate was carried to the engine then a subsequent combustion would potentially be unstable. Boost may be reduced or terminated in response to a condensate level exceeding the threshold condensate level. If boost is terminated, then a combustion chamber pressure may decrease and combustion may be inefficient and/or unstable. In order to increase the combustion chamber pressure, the compression ratio may be increased in response to the condensate exceeding the threshold condensate level.

If the CAC condensate level is less than the threshold condensate level, then the method 700 proceeds to 706 to operate in the first setting, as described above. However, if the CAC condensate level is greater than the threshold condensate level then the method 700 proceeds to 712 to operate in the second setting and actuate the control element to increase the compression ratio. In order to increase the compression ratio, the volume of the combustion chamber is increased.

In one embodiment, step 710 may be omitted from the method 700 such that the method 700 may enter the second setting in response to only the engine load being less than the threshold load. In another embodiment, additionally or alternatively, the method 700 may enter the second setting in response to one or more of the engine load being less than the threshold load and the CAC condensate level begin greater than the threshold condensate level.

By entering the second setting at 712, the method 700 moves the control element toward the combustion chamber (e.g., to a second position P2 of FIG. 3) such that the volume of the combustion chamber is decreased and thus, the compression ratio is increased. Furthermore, the control element is rotated in a counterclockwise direction such that a spark plug and a fuel injector arranged in the control element are equidistant from an exhaust valve and an inlet valve (e.g., second position A2 of FIG. 5).

In one embodiment, additionally or alternatively, the control element may be moved toward the combustion chamber without rotating the control element. In this way, the control element may be in the second position P2 with a first orientation A1 of FIG. 4.

At 713, the method 700 includes adjusting the engine operation based on the second setting. The adjustments may include one or more of decreasing an injection pressure, decreasing or terminating boost, and advancing spark. These adjustments may assist in decreasing a combustion temperature in order to decrease emissions during operation in the second setting.

In one embodiment, additionally or alternatively, adjusting the rotation and position of the control element which the spark plug and/or injector are mounted is in response to a position of a CMCV. In a second embodiment, additionally or alternatively, a position of the CMCV is adjusted in response to a position of the control element.

At 714, the method 700 includes determining if the second setting conditions are no longer met. As an example, the second setting conditions may no longer be met if the engine load is greater than the threshold load. If the second setting conditions are still met, then the method 700 proceeds to 716 to continue operating in the second setting and not terminate operation in the second setting (e.g., control element remains in the second position P2 nearest the combustion chamber).

If the second setting conditions are no longer met, then the method 700 proceeds to 718 to terminate the second setting and enter the first setting via actuating the control element to a position farthest away from the combustion chamber and rotating the control element clockwise. Transitioning from the second setting to the first setting results in increasing the combustion chamber volume and decreasing the compression ratio of the combustion chamber.

In this way, a compression ratio of a combustion chamber may be altered via actuating a control element from a first position to a second position or vice versa. The first position includes positioning the control element at a location farthest from the combustion chamber. The second position includes positioning the control element at a location nearest the combustion chamber. By doing this, the compression ratio of the combustion chamber is minimized at the first position and maximized at the second position. Furthermore, the control element may be rotated such that a spark plug and a fuel injector of the control element are proximal to an exhaust valve and an inlet valve while in the first position, respectively. Conversely, the spark plug and the fuel injector of the control element are equidistant to the exhaust valve and the inlet valve in the second position. By doing this, a fuel efficiency is further increased as a result of the actuation.

The technical effect of actuating the control element such that an axial position and orientation of the control element are adjusted is to increase a fuel efficiency. By altering the orientation of the control element, an orientation of the spark plug and/or the fuel injector of the control element is also altered. In this way, specifically at lower loads, emissions are decreased despite an increase in combustion temperature due to the increased compression ratio. Thus, both an increased fuel efficiency and decreased emissions may be realized despite increased combustion temperatures during the increased compression ratio.

A method comprises adjusting a compression ratio of a combustion chamber via adjusting a volume of the combustion chamber by actuating a control element along a control element axis. The control element comprises a spark plug and a fuel injector. The method, additionally or alternatively, further includes adjusting the compression ratio which includes one or more of displacing and rotating the control element to a first setting and a second setting. The first setting includes actuating the control element to a first position farthest away from the combustion chamber and rotating the control element in a clockwise direction about the control axis. The second setting includes actuating the control element to a second position nearest to the combustion chamber and rotating the control element in a counterclockwise direction about the control axis. Displacing and rotating the control element further includes actuating a charge motion control valve based on movement of the control element. Displacing the control element is in response to one or more of an engine load and a condensate level in a charge air cooler.

A second method comprises adjusting a control element housing a spark plug and a fuel injector to decrease a compression ratio. Adjusting the control element includes adjusting to a first position in order to decrease the compression ratio and adjusting to a second position in order to increase the compression ratio. Additionally or alternatively, adjusting the control element further includes changing an axial position and a rotational orientation of one or more of the control element, the spark plug, and the fuel injector. Adjusting the control element to a first position includes raising the control element away from a combustion chamber and rotating the control element in a clockwise direction in response to an engine load being greater than a threshold load. The first position further includes the spark plug being proximal to one or more exhaust valves and the fuel injector being proximal to one or more inlet valves. Adjusting the control element to a second position includes lowering the control element toward a combustion chamber and rotating the control element in a counterclockwise direction in response to one or more of an engine load being less than a threshold load and a condensate level of a charge air cooler being greater than a condensate threshold. The spark plug and the fuel injector are equidistant to one or more exhaust valves and inlet valves when the control element is in the second position. The method, additionally or alternatively, includes the first position increasing a volume of a combustion chamber and thereby decreasing a compression ratio of the combustion chamber. The second position decreases a volume of a combustion chamber and thereby increases a compression ratio of the combustion chamber. The method, additionally or alternatively, further includes adjusting a charge motion control valve in response to the control element moving toward either the first position or the second position. Fully activating the charge motion control valve when the control element is in the second position and decreasing activation or terminating the charge motion control valve when the control element is in the first position.

A system comprising a combustion chamber with a piston. The piston is movable along a stroke axis. A control element is disposed above the piston in a combustion chamber head. The control element is movable and rotatable along a control element axis parallel to the stroke axis such that an axial location and a rotational orientation of the control element are altered upon actuating the control element. A spark plug and a fuel injector arranged in the control element. A controller with computer-readable instructions for actuating the control element to a first position in response to an engine load being greater than a threshold load and actuating the control element to a second position in response to the engine load being less than the threshold load. A location and an orientation of the spark plug and the fuel injector are altered corresponding to alteration of the axial location and the rotational orientation of the control element. A charge motion control valve where the charge motion control valve is altered based on the control element being in the first position or the second position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a compression ratio of a combustion chamber via adjusting a volume of the combustion chamber by actuating a control element along a control element axis, the control element comprising a spark plug and a fuel injector, the actuating including rotating the control element during its displacement to and away from the combustion chamber, where the spark plug is closer to exhaust valves and the fuel injector is closer to intake valves as the control element moves farthest away from the combustion chamber, and where the spark plug and fuel injector are wore equidistant to the exhaust and intake valves as the control element moves closer to the combustion chamber.

2. The method of claim 1, wherein adjusting the compression ratio includes one or more of displacing and rotating the control element to a first setting and a second setting along the control element axis, which is parallel to a stroke axis of a piston of the combustion chamber, the spark plug and fuel injector mounted directly to the control element without any other components therebetween.

3. The method of claim 2, wherein the first setting includes actuating the control element to a first position farthest away from the combustion chamber and rotating the control element in a clockwise direction about the control element axis.

4. The method of claim 2, wherein the second setting includes actuating the control element to a second position nearest to the combustion chamber and rotating the control element in a counterclockwise direction about the control element axis.

5. The method of claim 1, wherein displacing and rotating the control element further includes actuating a charge motion control valve based on movement of the control element.

6. The method of claim 1, wherein displacing the control element is in response to one or more of an engine load and a condensate level in a charge air cooler.

7. A method, comprising:
adjusting a control element housing a spark plug and a fuel injector to decrease a compression ratio, wherein adjusting the control element to decrease the compression ratio includes displacing and rotating the control element, spark plug, and fuel injector further away from intake and exhaust valves of a cylinder, and where the spark plug and fuel injector are equidistant from the intake and exhaust valves.

8. The method of claim 7, wherein adjusting the control element includes adjusting to a first position to decrease the compression ratio and adjusting to a second position to increase the compression ratio.

9. The method of claim 7, wherein adjusting the control element includes changing an axial position and a rotational orientation of the control element, the spark plug, and the fuel injector along an axis parallel to movement of a piston of the cylinder.

10. The method of claim 7, wherein adjusting the control element to a first position includes raising the control element away from the cylinder and rotating the control element in a clockwise direction in response to an engine load being greater than a threshold load.

11. The method of claim 10, wherein the spark plug is proximal to one or more exhaust valves and the fuel injector is proximal to one or more inlet valves when the control element is in the first position.

12. A method comprising:
adjusting a control element housing a spark plug and a fuel injector to adjust a compression ratio, wherein adjusting the control element includes lowering the control element toward a combustion chamber and rotating the control element in a counterclockwise direction in response to one or more of an engine load being less than a threshold load and a condensate level of a charge air cooler being greater than a condensate threshold.

13. The method of claim 12, wherein the spark plug and the fuel injector are equidistant to one or more exhaust valves and inlet valves when the control element is lowered and rotated counterclockwise.

14. The method of claim 13, further comprising raising the control element away from the combustion chamber and rotating the control element in a clockwise direction to a first position to increase a volume of the combustion chamber and thereby decrease the compression ratio of the combustion chamber, where a second position includes lowering and rotating the control element counterclockwise.

15. The method of claim 14, wherein the second position decreases a volume of the combustion chamber and thereby increases the compression ratio of the combustion chamber.

16. The method of claim 14, further comprising adjusting a charge motion control valve in response to the control element moving toward either the first position or the second position.

17. The method of claim 16, further comprising fully activating the charge motion control valve when the control element is in the second position and decreasing activation or terminating the charge motion control valve when the control element is in the first position.

18. A system, comprising:
a combustion chamber comprising a piston;
the piston movable along a stroke axis;
a control element disposed above the piston in a combustion chamber head, the control element movable and rotatable along a control element axis parallel to the stroke axis such that an axial location and a rotational orientation of the control element are altered upon actuating the control element;
a spark plug and a fuel injector arranged in the control element; and a controller with computer-readable instructions for:
actuating the control element to a first position in response to an engine load being greater than a threshold load and actuating the control element to a second position in response to the engine load being less than the threshold load, where the control element, spark plug, and fuel injector are closer to one or more intake and exhaust valves of the combustion chamber in the first position, further comprising the spark plug being proximal to one or more exhaust valves and the fuel injector being proximal to one or more intake valves in the first position, and where the control element, spark plug, and fuel injector are moved further away from one or more intake and exhaust valves of the combustion chamber in the second position, the second position further comprising the fuel injector and spark plug being equidistant to the intake and exhaust valves.

19. The system of claim 18, wherein a location and an orientation of the spark plug and the fuel injector are altered corresponding to alteration of the axial location and the rotational orientation of the control element.

20. The system of claim 18, further comprising a charge motion control valve where the charge motion control valve is altered based on the control element being in the first position or the second position.

* * * * *

UNITED STATES PATENT AND TRADEMARK OFFICE
CERTIFICATE OF CORRECTION

PATENT NO. : 9,683,493 B2
APPLICATION NO. : 14/734540
DATED : June 20, 2017
INVENTOR(S) : Hans Guenter Quix et al.

Page 1 of 1

It is certified that error appears in the above-identified patent and that said Letters Patent is hereby corrected as shown below:

In the Claims

Column 13, Line 35, Claim 1, "wore" should read "more".

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*